US012320589B1

(12) United States Patent
Ellis

(10) Patent No.: US 12,320,589 B1
(45) Date of Patent: Jun. 3, 2025

(54) ENERGY TREATMENT APPARATUS FOR FABRIC WEBS

(71) Applicant: Michael A. Ellis, Dalton, GA (US)

(72) Inventor: Michael A. Ellis, Dalton, GA (US)

( * ) Notice: Subject to any disclaimer, the term of this patent is extended or adjusted under 35 U.S.C. 154(b) by 848 days.

(21) Appl. No.: 17/544,714

(22) Filed: Dec. 7, 2021

Related U.S. Application Data

(60) Provisional application No. 63/123,256, filed on Dec. 9, 2020.

(51) Int. Cl.

| | |
|---|---|
| ***F26B 3/30*** | (2006.01) |
| ***D06C 7/00*** | (2006.01) |
| ***F26B 13/14*** | (2006.01) |
| ***F26B 23/04*** | (2006.01) |
| ***F26B 25/02*** | (2006.01) |
| ***F26B 25/06*** | (2006.01) |

(52) U.S. Cl.

CPC .................. *F26B 3/30* (2013.01); *D06C 7/00* (2013.01); *F26B 13/14* (2013.01); *F26B 23/04* (2013.01); *F26B 25/02* (2013.01); *F26B 25/066* (2013.01)

(58) Field of Classification Search

CPC .. F26B 3/30; F26B 13/14; F26B 23/04; F26B 25/02; F26B 25/066; D06C 7/00

USPC ............................................................ 34/273

See application file for complete search history.

(56) References Cited

U.S. PATENT DOCUMENTS

| | | | | |
|---|---|---|---|---|
| 347,212 A * | 8/1886 | Varney | D06C 3/00 | 34/646 |
| 1,530,064 A * | 3/1925 | Walsh | D01C 5/00 | 34/68 |
| 2,109,704 A * | 3/1938 | Morrill | D06C 3/00 | 34/223 |
| 5,943,747 A * | 8/1999 | Muller | D06C 7/02 | 34/646 |
| 6,094,834 A * | 8/2000 | Taipale | D21F 1/0036 | 34/95 |
| 7,201,572 B2 * | 4/2007 | Wood | C04B 35/632 | 428/210 |
| 8,196,312 B2 * | 6/2012 | Taguchi | F26B 13/10 | 159/7 |

(Continued)

FOREIGN PATENT DOCUMENTS

| | | | |
|---|---|---|---|
| DE | 10343407 A1 * | 4/2005 | D06C 7/02 |
| GB | 1210980 A * | 4/1970 | D06B 19/0058 |

(Continued)

*Primary Examiner* — Stephen M Gravini

(74) *Attorney, Agent, or Firm* — QuickPatents; Kevin Prince

(57) ABSTRACT

An energy treatment apparatus for a fabric web includes a tenter mechanism that includes a pair of opposing tracks through which a drive chain traverses. The tracks each have an inwardly-facing slot through which a plurality of web gripping elements project to hold an edge of the fabric web. At least one energy applying module has an enclosure with an opening therethrough and at least one energy applying element disposed on either side of the fabric web as the fabric web traverses the energy applying module. Each energy applying module is adapted to be stacked. An exhaust module is fixed at a top of each stack to convey hot exhaust away from the stack. In embodiments having two or more of the stacks, a web direction reversal apparatus is fixed between each stack such that the fabric web exiting one of the stacks is redirected into a next stack.

10 Claims, 6 Drawing Sheets

(56) References Cited

U.S. PATENT DOCUMENTS

| | | | | |
|---|---|---|---|---|
| 8,826,558 | B2 * | 9/2014 | Priebe | F26B 3/22 430/62 |
| 10,488,108 | B2 * | 11/2019 | Plavnik | F26B 5/02 |
| 11,370,196 | B2 * | 6/2022 | Viard | C08F 283/00 |
| 12,012,681 | B2 * | 6/2024 | He | C08G 63/90 |
| 2014/0259721 | A1 * | 9/2014 | Durdag | F26B 5/16 34/95 |
| 2020/0055076 | A1 * | 2/2020 | Kiener | B05C 1/08 |

FOREIGN PATENT DOCUMENTS

| | | | | |
|---|---|---|---|---|
| JP | 4092593 | B2 * | 5/2008 | B41C 1/1083 |
| WO | WO-2016003601 | A1 * | 1/2016 | D21F 5/006 |

* cited by examiner

ENERGY TREATMENT APPARATUS FOR FABRIC WEBS

CROSS-REFERENCE TO RELATED APPLICATIONS

This application claims the benefit of U.S. Provisional Patent Application 63/123,256, filed on Dec. 9, 2020, and is incorporated herein by reference.

STATEMENT REGARDING FEDERALLY SPONSORED RESEARCH AND DEVELOPMENT

Not Applicable.

FIELD OF THE INVENTION

This invention relates to energy treatment of web materials such as fabric, carpet, textile, and film webs, and more particularly to a modular energy treatment device.

BACKGROUND

Herein the term "web" can refer to a variety of web materials such as fabric, carpet, textile, and even film webs. During manufacturing of a fabric web, such as a carpet fabric web, the web must be heated or dried, or exposed to UV light at certain stages in order to cure UV coatings or the like. Herein the terms "heat," "heating," and "energy treatment" may refer to UV light exposure, in addition to infrared heat exposure or other radiant heat exposure. Such a heating process has the drawback of shrinking the web during heating, and thus to obtain a carpet having a certain width, a carpet with a larger width must be made upstream of any heating equipment. Such shrinkage is wasteful, yet no web heating systems in the prior art are available that reduce the propensity of the web to shrink when heated.

Therefore, there is a need for an apparatus that would maintain a desired width of the web through a drying, heating, or energy-application process. Such a needed apparatus would allow for a plurality of energy applying modules to be stacked together, in order to provide a selectable amount of energy that is applied to the web. Further, such a needed system would allow for the use of multiple stacks of the energy applying modules. The present apparatus would further allow for adapting to various footprint and height sizes as is available at a particular manufacturing location. The present invention accomplishes these objectives.

SUMMARY OF THE INVENTION

The present device is an energy treatment apparatus for a web of the type having a width between two web edges, a top side, and a bottom side. Such a web is, for example, a carpet web that requires drying or heating during manufacturing thereof, or exposure to UV light to cure a UV coating, or the like.

The energy treatment apparatus includes a tenter mechanism includes a pair of opposing tracks through which a drive chain traverses. The tracks each have an inwardly-facing slot through which a plurality of web gripping elements project, such as a pin-plate or similar attachment device. Each web gripping element is fixed with the web at one of the web edges thereof. A tenter drive is connected with each drive chain through at least a pair of drive gears to move each drive chain through one of the tracks.

At least one energy applying module has an enclosure with an opening at a first side and at a second opposing side. Each opening has a width sufficient to accommodate the width of the web and the opposing tracks, such that the web traverses the energy applying module from the first side through to the second side. The energy applying module includes at least one energy applying element disposed on each side of the web as the web traverses the energy applying module. Each energy applying module is adapted to be mutually stacked so that the web exiting a first energy applying module enters a second energy applying module, and so on, until the web enters a top energy applying module and exits therefrom. Each such stacked energy applying module forms a stack.

An exhaust module is fixed above the top energy applying module of each stack to convey hot exhaust from within the energy applying modules away from the stack. Such an exhaust module may include a fan or blower to actively blow the hot exhaust away from the stack. In some lower temperature applications, the hot exhaust may leave through the exhaust module by heat convection.

In embodiments having two or more of the stacks, a web direction reversal apparatus is fixed between each stack such that the web exiting one of the stacks is redirected into a next stack of the energy applying modules. A base module is preferably included to support each stack of the energy applying modules thereon. The base module includes a frame that is adapted for resting on a horizontal support surface, and further includes at least one pully roller around which the web can be directed.

In use, as the web enters each energy applying module in turn, the web is treated with energy while the tenting mechanism maintains the width of the web through the apparatus.

The present invention is an apparatus that maintains a desired width of the carpet web through a drying, heating, or energy-applying process. The present apparatus allows for a plurality of energy applying modules to be stacked together, in order to provide a selectable amount of energy that is applied to the web. Further, the present invention allows for the use of multiple stacks of the energy applying modules. The present apparatus further allows for adapting to various footprint and height sizes as is available at a particular manufacturing location. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
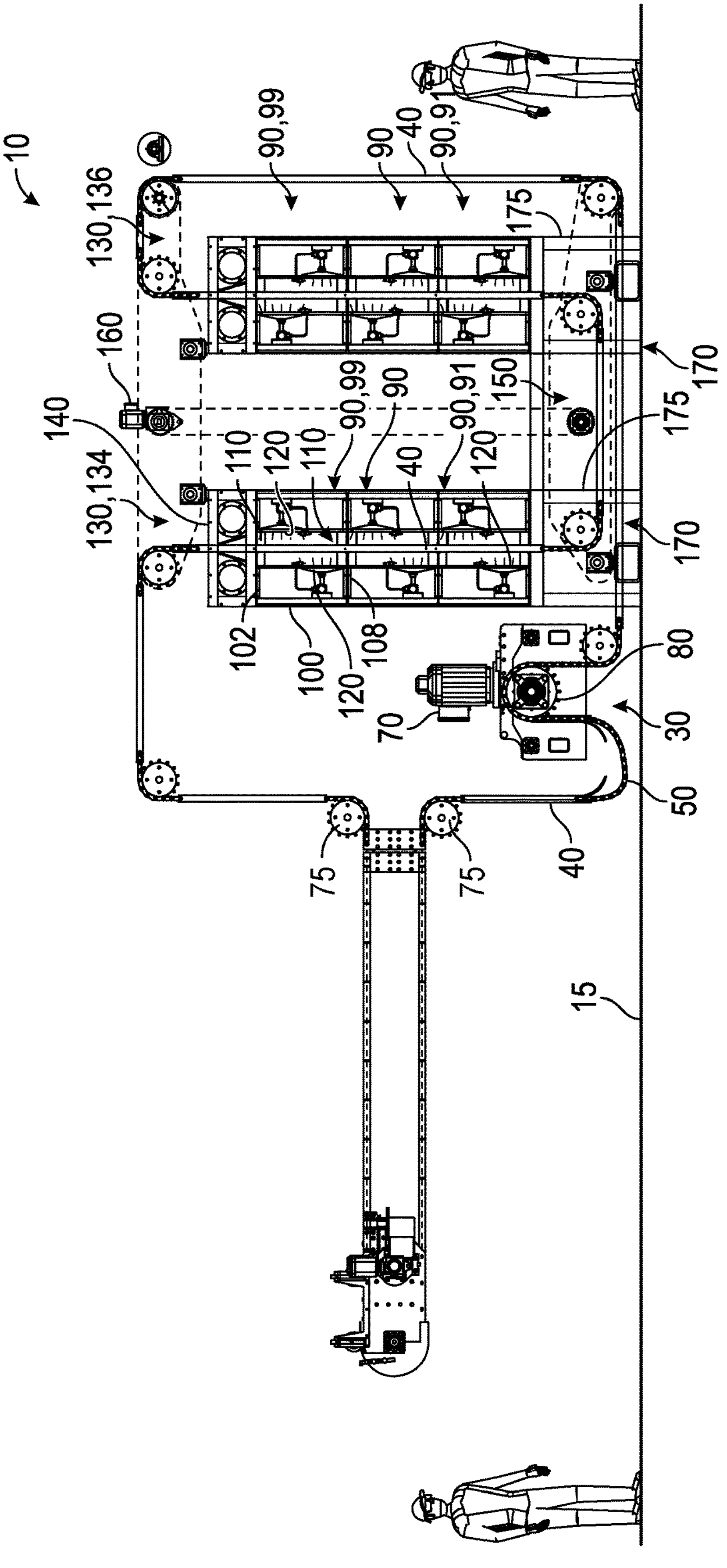
FIG. 1 is a side elevational view of the invention.
Figure 2:
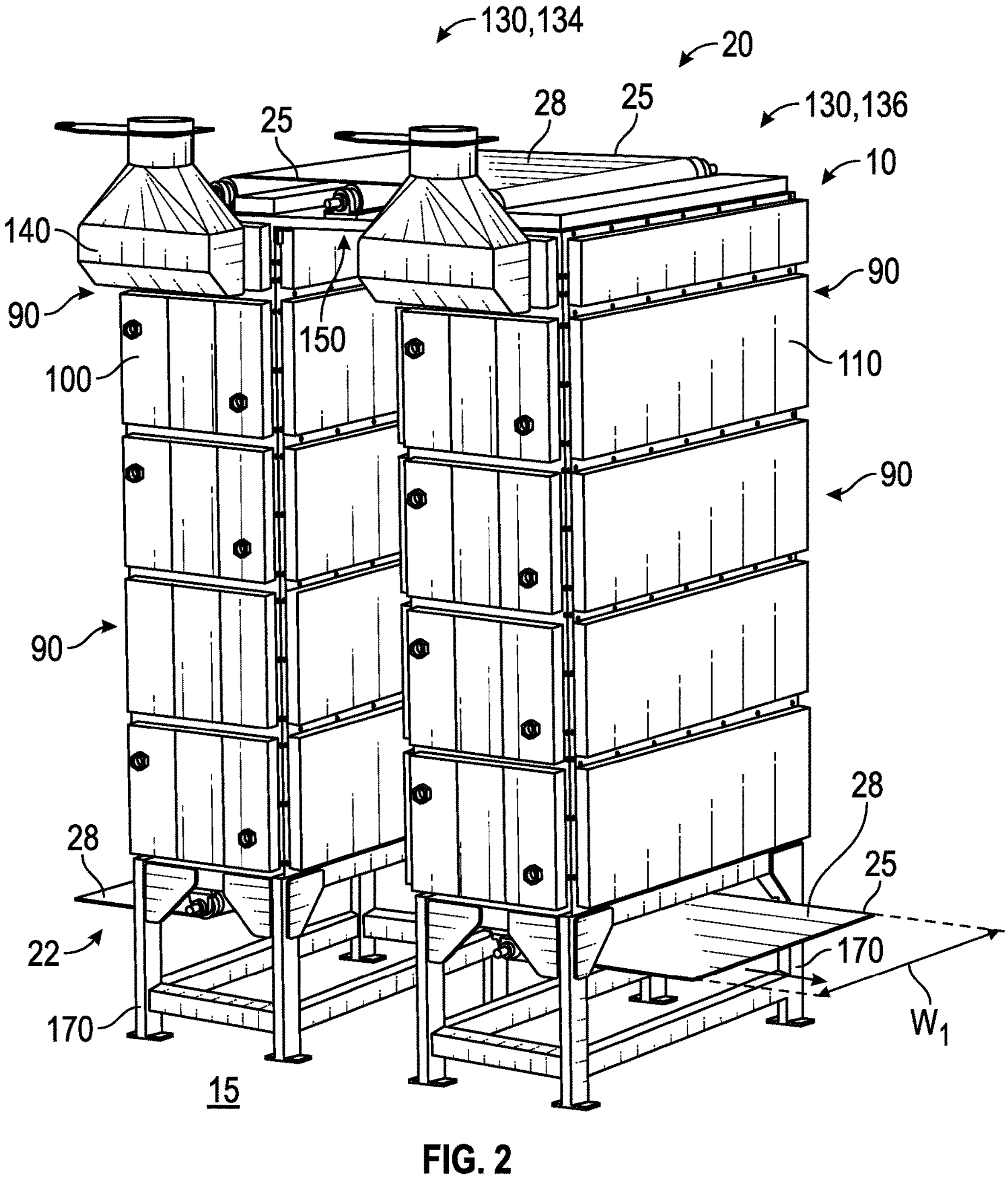
FIG. 2 is a perspective view of a two-stack embodiment of the invention, a tenter mechanism thereof omitted for clarity of illustration.

FIGS. 1 and 2 illustrate an energy treatment apparatus 10 for a web 20 of the type having a width $W_1$ between two web edges 25, a top side 28, and a bottom side 22. Such a web 20 is, for example, a carpet web 20 that has had UV-activated coatings applied thereto, or a carpet web 20 during any process of manufacturing that requires heat treatment, UV application, or other drying of the carpet web 20. Herein "heat treatment" and "energy treatment" may mean treatment by radiated heat, UV exposure, IR exposure, or the like.

Figure 7:
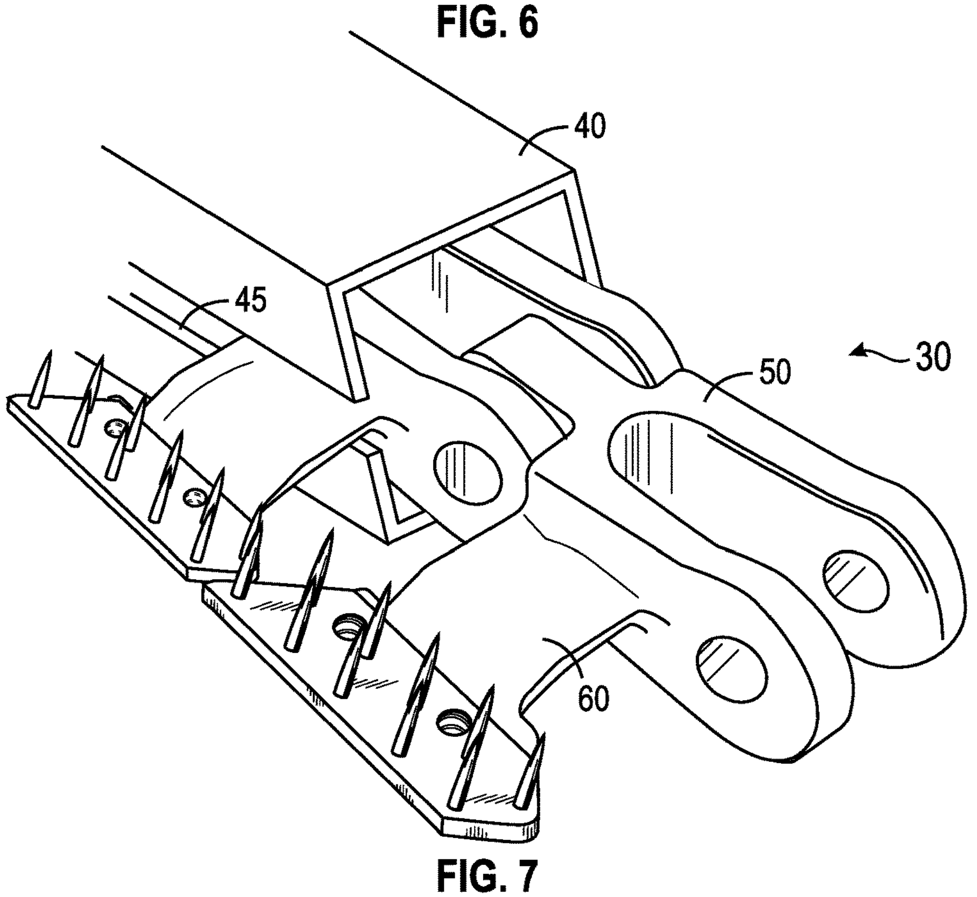
FIG. 7 is a partial enlarged perspective view of a tenter mechanism showing a track through which a drive chain traverses.

The energy treatment apparatus 10 includes a tenter mechanism 30 (FIGS. 1 and 7) that includes a pair of opposing tracks 40 through which a drive chain 50 traverses. The tracks 40 each have an inwardly-facing slot 45 through which a plurality of web gripping elements 60 project. Each web gripping element 60 is fixed with the web 20 at one of the web edges 25 thereof. A tenter drive 70 is connected with each drive chain 50 through at least a pair of drive gears 80 to move each drive chain 50 through one of the tracks 40. The tenter mechanism 30 stabilizes the width $W_1$ of the web 20 throughout the energy treatment apparatus 10, and can aid in eliminating shrinking or pattern distortion in the web 20. In some cases, as with a carpet web 20, the tenter mechanism 30 can stretch the web 20 to produce a greater surface area of the web 20 in the end product.

Figure 5:
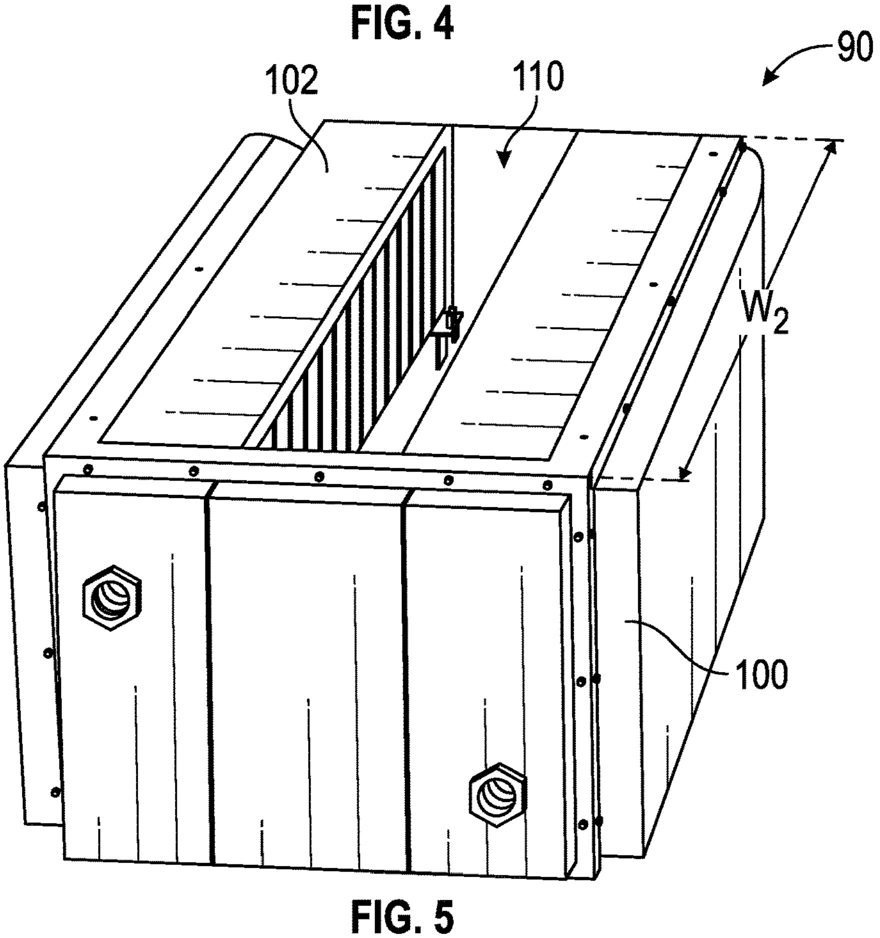
FIG. 5 is a top perspective view of an energy applying module of the invention.

At least one energy applying module 90 has an enclosure 100 with an opening 110 at a first side 102 and at a second opposing side 108. Each opening 110 has a width $W_2$ (FIG. 5) sufficient to accommodate the width $W_1$ of the web 20 and the opposing tracks 40, such that the web 20 traverses the energy applying module 90 from the first side 102 through to the second side 108. The energy applying module 90 includes at least one energy applying element 120 disposed on each side 28, 22 of the web 20 as the web 20 traverses the energy applying module 90. Preferably each energy applying element 120 is a UV or Infrared energy applying element, preferably powered by natural gas or electricity. Each energy applying module 90 is adapted to be mutually stacked so that the web 20 exiting a first energy applying module 91 enters a second energy applying module 94 (FIG. 2), and then upon exiting the second energy applying module 94 enters a next energy applying module 96, until the web enters a top energy applying module 99 and exits therefrom, each such stacked energy applying module 90 forming a stack 130.

Figure 3:
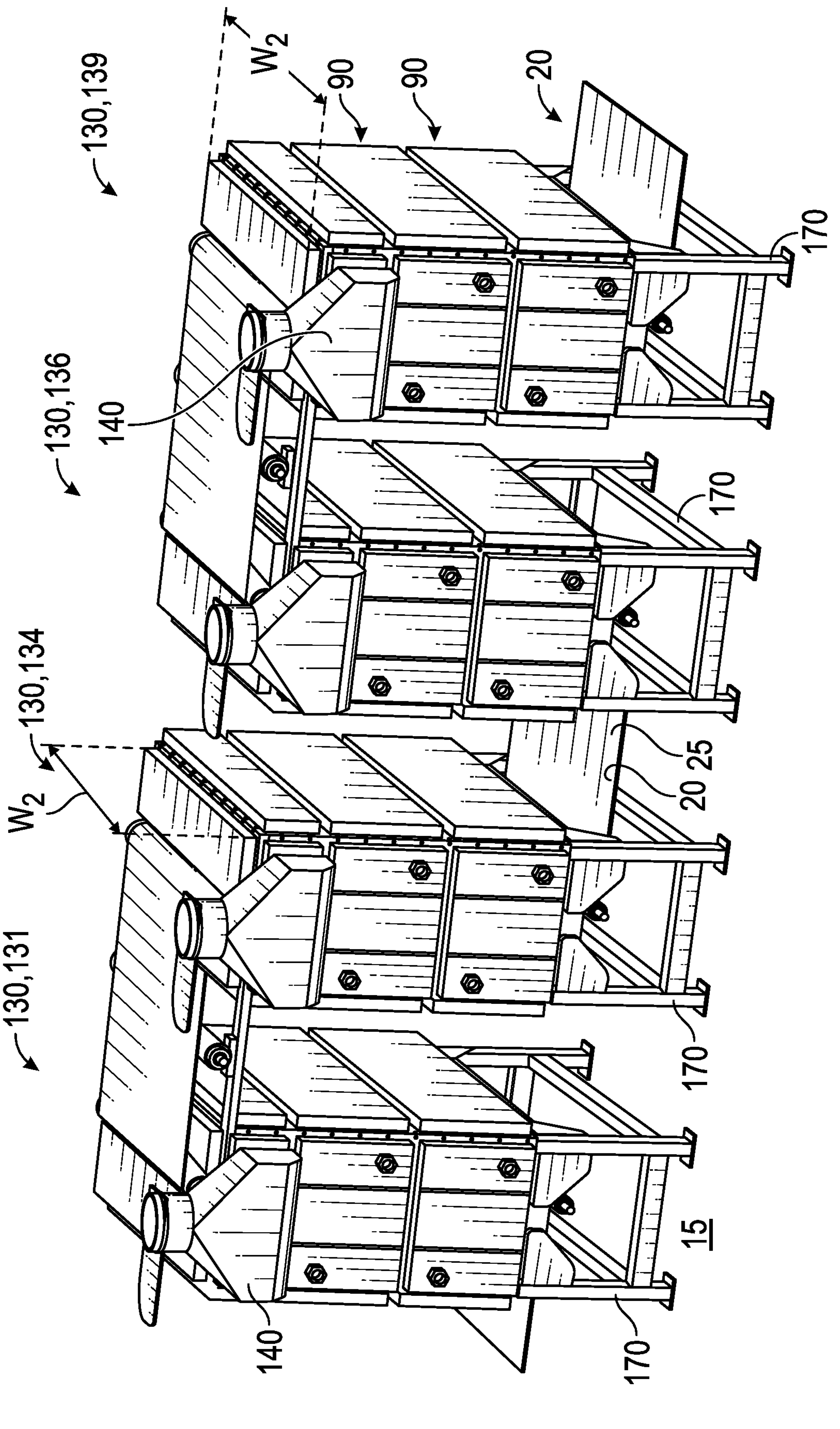
FIG. 3 is a perspective view of four-stack embodiment of the invention, a tenter mechanism thereof omitted for clarity of illustration.
Figure 4:
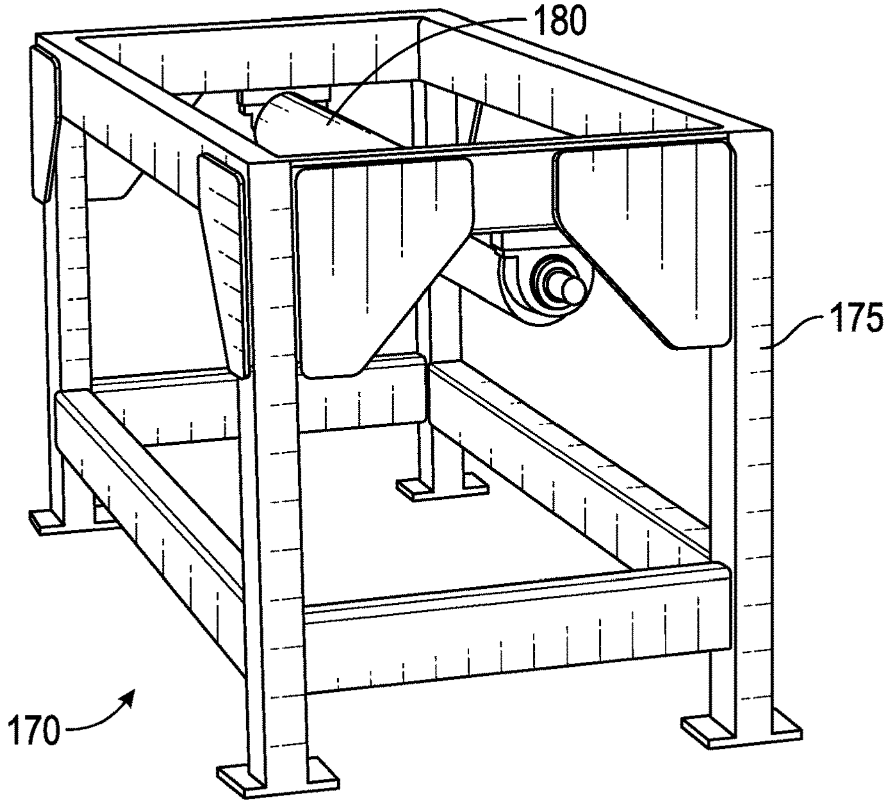
FIG. 4 is a perspective view of a base module of the invention.

FIG. 1 illustrates an embodiment having two of the stacks 130, FIG. 2 illustrates an embodiment having two of the stacks 130, and FIG. 3 illustrates an embodiment having four of the stacks 130. Any number of the energy applying modules 90 may be included in the stack 130, such as three of the energy applying modules 90 in the case of the embodiment shown in FIG. 1, four of the energy applying modules 90 in the case of the embodiment shown in FIG. 2, and two of the energy applying modules 90 in the case of the embodiment shown in FIG. 3.

Figure 6:
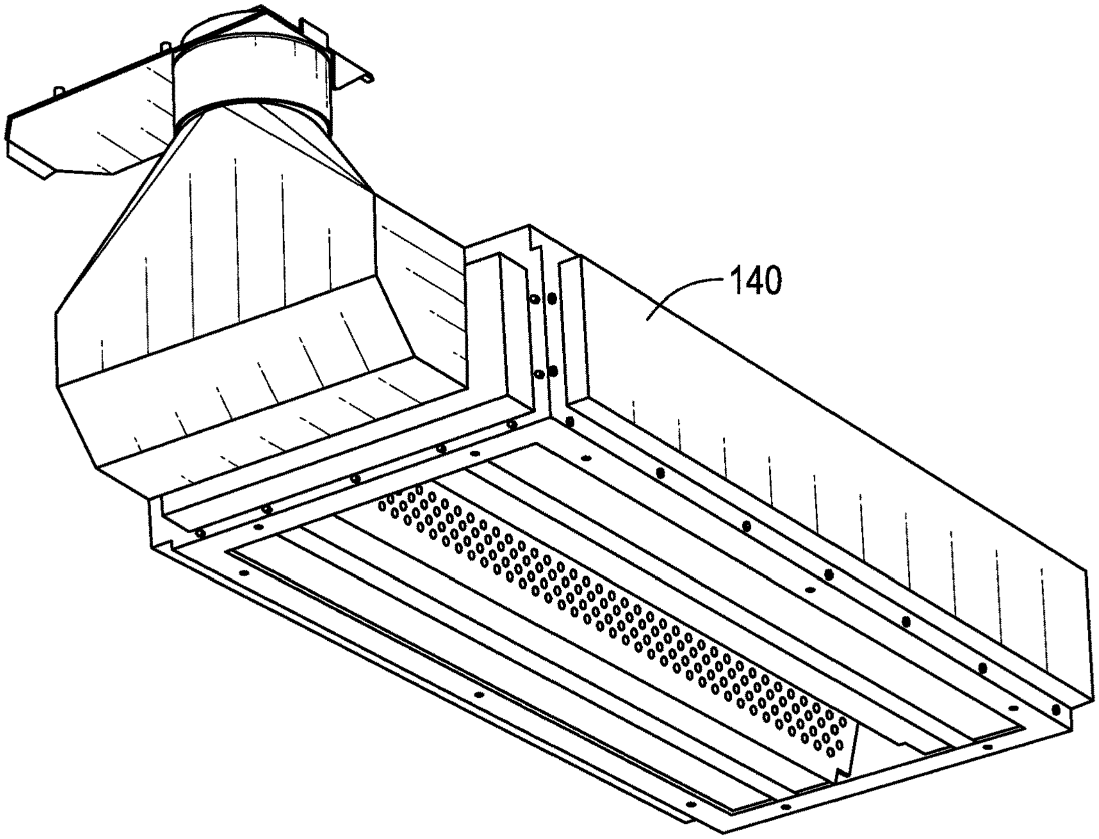
FIG. 6 is a bottom perspective view of an exhaust module of the invention.

An exhaust module 140 (FIG. 6) is fixed above the top energy applying module 99 of the stack 130 to convey hot exhaust from within the energy applying modules 90 away from the stack 130. Such an exhaust module 140 may include a fan or blower (not shown) to actively blow the hot exhaust away from the stack 130. In some lower temperature applications, the hot exhaust may leave through the exhaust module 140 by heat convection.

In embodiments having two or more of the stacks 130, a web direction reversal apparatus 150 (FIGS. 1 and 2) is fixed between each stack 130 such that the web 20 exiting one of the stacks 134 is redirected into a next stack 136 of the energy applying modules 90.

A base module 170 (FIGS. 1-4) is preferably included to support each stack 130 of the energy applying modules 90 thereon. The base module 170 includes a frame 175 that is adapted for resting on a horizontal support surface 15, and further includes at least one pully roller 180 around which the web 20 can be directed.

Figure 8:
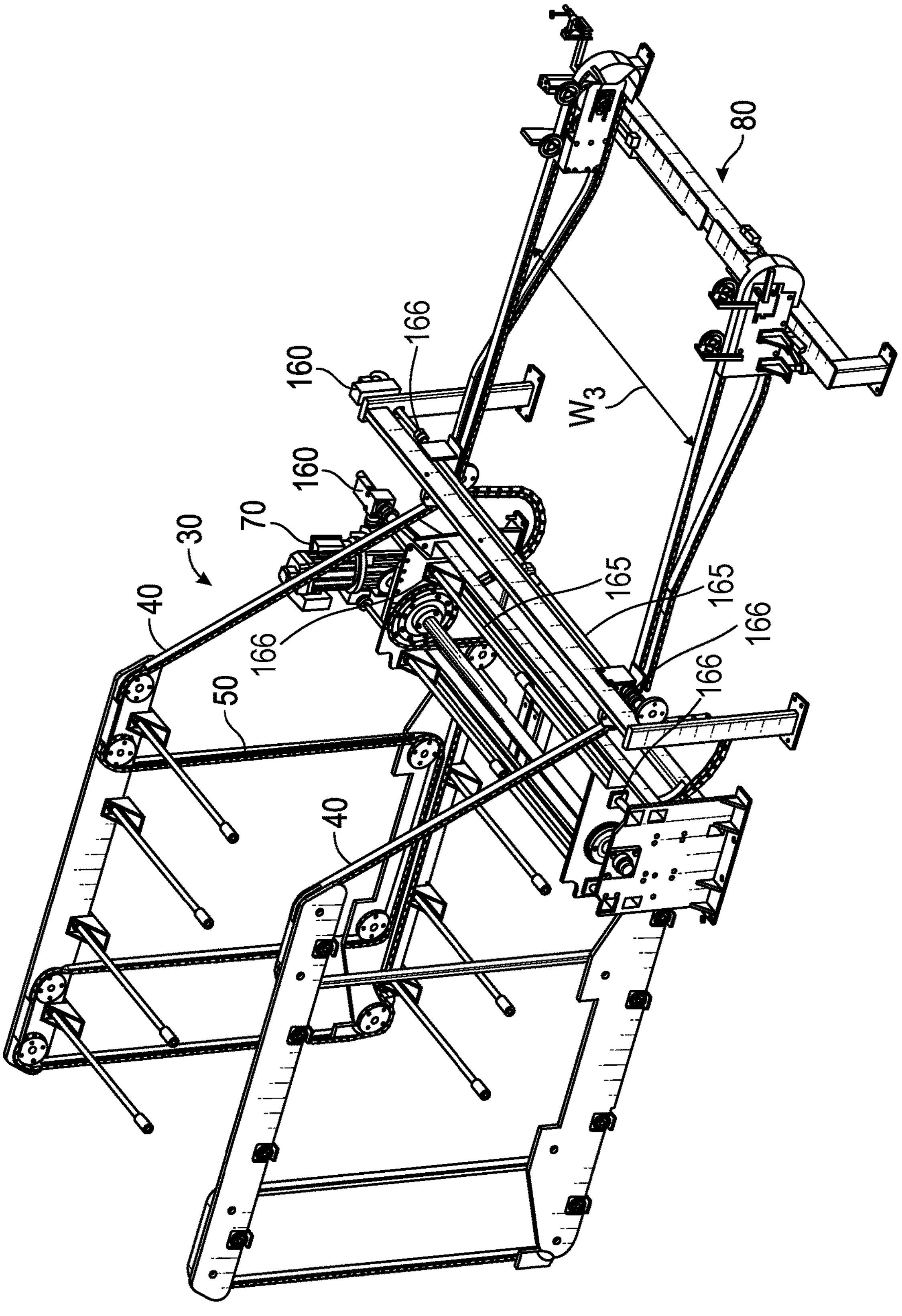
FIG. 8 is a perspective view of the tenter mechanism with the energy applying modules of the invention omitted for clarity of illustration.

In use, as the web 20 enters each energy applying module 90 in turn, the web 20 is treated with energy while the tenting mechanism 30 maintains the width $W_1$ of the web 20 through the apparatus 10. The web 20 enters the treatment apparatus 10 at a height that accommodates any previous process. For example, in FIG. 1 the height of the web 20 entering the treatment apparatus 10 is about 84 inches above the support surface 15, while in FIG. 8 the height is shown at a more common 42 inches above the support surface 15. Sprockets 75 (FIG. 1) can be adjusted vertically to accommodate a receiving height of the web 20.

In some embodiments the energy treatment apparatus 10 further includes at least one width drive 160 (FIGS. 1 and 8) adapted to adjust a width $W_3$ between each of the two tracks 40 of the tenter mechanism 30 through the energy treatment apparatus 10. Such a width drive 160 includes a shaft 165 with opposing threads 166 at opposing ends. The opposing threads 166 cause the opposing tracks 40 to move towards each other when the shaft 165 is rotated in one direction, and move away from each other when the shaft 165 is rotated in an opposite direction. In this way the width $W_1$ of the web 20 can be adjusted as the web 20 is subjected to energy through the energy treatment apparatus 10.

While a particular form of the invention has been illustrated and described, it will be apparent that various modifications can be made without departing from the spirit and scope of the invention. For example, certain paths of the web 20 are illustrated in the drawings, but other paths and configurations of the energy applying modules 90, stacks 130, base modules 170, and web direction reversal apparatuses 150 could be utilized depending on an amount of floor space available and a ceiling height. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An energy treatment apparatus for a fabric web of a type having a width between two web edges, a top side and a bottom side, the energy treatment apparatus comprising:

a tenter mechanism including a pair of opposing tracks through which a drive chain traverses, the tracks each having an inwardly-facing slot through which a plurality of web gripping elements project, each web gripping element fixed with the fabric web at one of the web edges thereof, a tenter drive connected with each drive chain through at least a pair of drive gears to move each drive chain through one of the tracks;

at least one energy applying module having an enclosure with an opening at each of a first side and a second opposing side, each opening having a width sufficient to accommodate the width of the fabric edge and the opposing tracks such that the fabric web traverses the energy applying module from the first side through to the second side, the energy applying module including at least one energy applying element disposed on each side of the fabric web to apply energy either the top side and the bottom side of the fabric web as the fabric web traverses the energy applying module, each energy applying module adapted to be mutually stacked so that the fabric web exiting a first energy applying module enters a second energy applying module, two or more of the stacked energy applying modules forming a stack of the energy applying modules;

an exhaust module fixed above a top energy applying module of the stack to convey hot exhaust from within the energy applying modules away from the stack;

whereby as the fabric web enters each energy applying module in turn, the fabric web is subjected to energy while the tenter mechanism maintains the width of the fabric web therethrough.

2. The energy treatment apparatus of claim 1 further including at least one additional stack of energy applying modules, a web direction reversal apparatus fixed between each stack such that the fabric web exiting one of the stacks is redirected into a next stack of the energy applying modules.

3. The energy treatment apparatus of claim 2 including two of the stacks each include three of the energy applying modules.

4. The energy treatment apparatus of claim 2 further including at least one width drive adapted to adjust a width between each of the pair of opposing tracks of the tenter mechanism through the energy treatment apparatus.

5. The energy treatment apparatus of claim 1 wherein at least one of the at least one energy applying element in the at least one energy applying module is an infrared energy applying element.

6. The energy treatment apparatus of claim 1 wherein at least one of the at least one energy applying element in the at least one energy applying module is an ultraviolet energy applying element.

7. The energy treatment apparatus of claim 1 further including at least one base module adapted for supporting a stack of the at least one energy applying modules thereon, the at least one base including a frame that is adapted for resting on a horizontal support surface and at least one pulley around which the fabric web can be directed.

8. An energy treatment apparatus for a fabric web of a type having a width between two web edges, a top side and a bottom side, the energy treatment apparatus comprising:

a tenter mechanism including a pair of opposing tracks through which a drive chain traverses, the tracks each having an inwardly-facing slot through which a plurality of web gripping elements project, each web gripping element fixed with the fabric web at one of the web edges thereof, a tenter drive connected with each drive chain through at least a pair of drive gears to move each drive chain through one of the tracks;

at least six energy applying modules each having an enclosure with an opening at each of a first side and a second opposing side, each opening having a width sufficient to accommodate the width of a fabric edge and the opposing tracks such that the fabric web traverses the at least six energy applying modules from the first side through to the second side, the at least six energy applying modules including at least one energy applying element disposed on each side of the fabric web to apply energy either the top side and the bottom side of the fabric web as the fabric web traverses the energy applying module, each energy applying module adapted to be mutually stacked so that the fabric web exiting a first energy applying module enters a second energy applying module, three or more of the stacked energy applying modules forming a stack of the energy applying modules, two or more of the stacks being included in the energy treatment apparatus;

an exhaust module fixed above a top energy applying module of the stack to convey hot exhaust from within the energy applying modules away from the stack;

a web direction reversal apparatus fixed between two adjacent stacks such that the fabric web exiting one of the stacks is redirected into a next stack;

at least one width drive adapted to adjust a width between each of the two tracks of the tenter mechanism through the energy treatment apparatus;

at least one base module each adapted for supporting a stack of the energy applying modules thereon, the at least one base module including a frame that is adapted for resting on a horizontal support surface and at least one pulley around which the fabric web can be directed;

whereby as the fabric web enters each energy applying module in turn, the fabric web is subjected to energy while the tenter mechanism maintains the width of the fabric web therethrough.

9. The energy treatment apparatus of claim 8 wherein at least one of the at least one energy applying element in at least one of the at least one energy applying module is an infrared energy applying element.

10. The energy treatment apparatus of claim 8 wherein at least one of the at least one energy applying element in at least one of the at least one energy applying module is an ultraviolet energy applying element.

* * * * *